UNITED STATES PATENT OFFICE.

THOMAS T. GAUNT, OF POUGHKEEPSIE, ASSIGNOR OF ONE-HALF OF HIS RIGHT TO JAMES GAUNT, OF NEW YORK, N. Y.

IMPROVEMENT IN FOOD FOR INVALIDS.

Specification forming part of Letters Patent No. 223,038, dated December 30, 1879; application filed April 15, 1879.

*To all whom it may concern:*

Be it known that I, THOMAS T. GAUNT, of Poughkeepsie, in the county of Dutchess and State of New York, have invented a new and Improved Food for Invalids, &c., of which the following is a full, clear, and exact description.

This invention is in the nature of an improved process of producing food for invalids and others; and the invention consists in the process hereinafter described for the isolation and production as food of albuminose, or peptone.

The chief purpose of this invention is to produce a food for invalids which shall be substantially a digested food, that will at once assimilate after it is taken into the stomach, without requiring further digestion, so that it will be retained in the stomachs of persons having weak digestive powers in cases where other food or nourishment would be rejected. For this purpose meat, blood, whether defibrinated or otherwise, milk, cereals, edible seeds, or any form of albumen whatsoever, is subjected for about the period of two days to the action of an artificial gastric juice—viz., to the action of .02 per cent., or two-tenths of one per cent., solution of hydrochloric acid, (HCl,) together with pepsin, in about the same proportion as a healthy gastric juice, preferably, however, somewhat stronger. This digesting-fluid is kept at a temperature of 35° centigrade, and the action of the artificial gastric juice is aided by constant agitation and by grinding the solid portion of the food. This grinding and agitation should reduce the solid portions to a state of minute subdivision. After the food has in this way been sufficiently treated by the action of the hydrochloric acid, pepsin, agitation, and grinding, the digestive and digested mixture is rendered neutral in reaction by the addition of sodium hydrate, (NaHO,) or sodium carbonate, ($Na_2CO_3$,) or bicarbonate of soda, ($NaHCO_3$.) The compound is then boiled and strained through a flannel or other substance, and filtered by rapid filtration through paper or other medium. The solution having previously been rendered neutral by boiling, all albuminous bodies other than albuminose, or peptone, (it alone being soluble in neutral solutions at boiling temperature,) are precipitated.

By subsequent filtration, as described above, the albuminose, or peptone, together with the other soluble substances present in the body used, remain in the filtrate. In this way the isolation of the albuminose, or peptone, is complete, and the result is a perfect solution of the same. This perfect solution is now to be concentrated down, either *in vacuo* or in "open pan," to a solid or to a dense solution.

Or, if desired, the digestive and digested mixtures may be first boiled to precipitate all albuminous bodies other than peptone, then filtered and the filtrate put in a vacuum-pan heated to a temperature of somewhat less than 100° centigrade. Under the reduced pressure the water boils, and is first driven off, after which the hydrochloric acid passes off, leaving the resulting solid neutral. This neutral solid may be dissolved up by a minimum amount of distilled water or other suitable substance, to form a concentrated solution, if desired, instead of a solid form for use.

By employing the process above named a complete isolation of the albuminose is effected and a satisfactory product obtained.

The pepsin employed in my process may be prepared by any of the well-known methods.

I am aware that an artificial gastric juice consisting of the same proportions of pepsin and hydrochloric acid as used in my process has been used before; but in all previous processes, so far as I know, the combined agitation and grinding has not been employed; consequently but a small portion of the albumen has been converted into albuminose, or peptone. My process, and it alone, by the means described, closely simulates the churning movement of the stomach during digestion. The processes heretofore used have proven ineffectual by requiring so long a time in the process of digestion, because of not being agitated or ground, that they have caused the decomposition of a certain amount of the already-formed albuminose, or peptone, into leucine and tyrosine. And, also, the rendering neutral in reaction has in all previous methods, so far as I am aware, been accomplished by sodium carbonate or sodium bicarbonate. The neutralization by sodium hydrate (NaHO) is more convenient and exact, as no carbon dioxide ($CO_2$) is generated, as is done by the use of sodium carbonate or sodium bicarbonate, and hence the rendering neutral in reaction may, by my process, be accomplished the more effectually, quickly, and exactly, thus improving the taste and making the product harmless, as only common salt and water are left.

I am also aware that beef-tea has been made by heating beef cut into small pieces and mixed with hydrochloric acid, pepsin, and water, and after disintegration straining and neutralizing the product.

By boiling a neutral solution of albuminose, or peptone, in the manner hereinbefore described, it is entirely freed from meta-peptone, para-peptone, or other partly-metamorphosed albuminous substances, and it is also freed from fibrous tissue and other irritating substances.

Having now described my invention, what I claim as new, and desire to secure by Letters Patent, is—

The process hereinbefore described for preparing albuminose, or peptone, by grinding and agitating albuminous bodies while such bodies are being digested with acid and pepsin, neutralizing the product, and isolating it by filtration, substantially as specified.

THOMAS T. GAUNT.

Witnesses:
  H. L. WATTENBERG,
  G. M. PLYMPTON.